(12) United States Patent
Deliwala (10) Patent No.: US 9,274,202 B2
(45) Date of Patent: Mar. 1, 2016

(54) OPTICAL TIME-OF-FLIGHT SYSTEM (71) Applicant: Shrenik Deliwala, Andover, MA (US)

(72) Inventor: Shrenik Deliwala, Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 13/924,874

(22) Filed: Jun. 24, 2013

(65) Prior Publication Data

US 2014/0375978 A1    Dec. 25, 2014

Related U.S. Application Data (60) Provisional application No. 61/837,472, filed on Jun. 20, 2013.

(51) Int. Cl.
*G01S 3/783* (2006.01)
*G01S 17/10* (2006.01)
*G01S 17/42* (2006.01)
*G01S 7/481* (2006.01)

(52) U.S. Cl.
CPC .............. *G01S 3/783* (2013.01); *G01S 7/4816* (2013.01); *G01S 17/10* (2013.01); *G01S 17/42* (2013.01)

(58) Field of Classification Search
CPC ............. H04N 5/21; H04N 9/77; H04N 9/64; G01S 17/89; G01S 17/936
USPC ............. 356/3.01–3.15, 4.01–4.1, 5.01–5.15, 356/6–22, 28, 28.5
See application file for complete search history.

(56) References Cited

U.S. PATENT DOCUMENTS

| 3,701,043 | A | 10/1972 | Zuleeg et al. |
| 5,602,384 | A * | 2/1997 | Nunogaki et al. ........ 250/203.4 |
| 6,522,395 | B1 * | 2/2003 | Bamji et al. ................ 356/5.01 |
| 8,581,307 | B1 | 11/2013 | Chen et al. |
| 2002/0028045 | A1 | 3/2002 | Yoshimura et al. |
| 2002/0109149 | A1 | 8/2002 | Chang |
| 2003/0159512 | A1 | 8/2003 | Zarabadi et al. |
| 2004/0235149 | A1 | 11/2004 | Barlocchi et al. |
| 2005/0176219 | A1 | 8/2005 | Kim et al. |
| 2006/0221250 | A1 * | 10/2006 | Rossbach et al. ............ 348/630 |
| 2008/0217623 | A1 | 9/2008 | Hara et al. |
| 2010/0148087 | A1 | 6/2010 | Doering et al. |
| 2010/0301728 | A1 | 12/2010 | Helbing et al. |
| 2011/0170105 | A1 | 7/2011 | Cui et al. |
| 2011/0228653 | A1 | 9/2011 | Shimazawa et al. |
| 2011/0254086 | A1 | 10/2011 | Hsieh |
| 2012/0019907 | A1 | 1/2012 | Argoul et al. |
| 2012/0025340 | A1 | 2/2012 | Park |
| 2012/0105823 | A1 * | 5/2012 | Hardegger et al. ......... 356/5.01 |
| 2013/0037700 | A1 | 2/2013 | Michiyama et al. |
| 2014/0306099 | A1 | 10/2014 | Oguchi et al. |

* cited by examiner

*Primary Examiner* — Luke Ratcliffe
(74) *Attorney, Agent, or Firm* — Kenyon & Kenyon LLP

(57) ABSTRACT

Time-of-flight technology may be combined with optical detection technology identifying an angle of a light pulse emitted from a transmitter and reflected off an object based on a proportion of the reflected light pulse detected at each of at least two light sensors. The optical detection technology may include a light detector with two or more light sensors arranged at different orientations with respect to an aperture in the detector so that each sensor is able to detect a different subset of the light passing through the aperture. The effective angle of the light passing through aperture may then be calculated from the proportion of light detected at the each of the sensors. The effective angle information may be combined with a calculated time-of-flight of the light pulse to accurately identify a position of the object relative to the detector in two or three dimensions.

20 Claims, 6 Drawing Sheets

OPTICAL TIME-OF-FLIGHT SYSTEM

RELATED APPLICATIONS

This application claims priority to provisional U.S. patent application Ser. No. 61/837,472, filed on Jun. 20, 2013, the content of which is incorporated herein in its entirety.

BACKGROUND

Time-of-flight systems have been used to calculate a distance of an object based on an amount of time it is takes a pulse of light to travel from a transmitters to the object and then from the object to a light detector. Different time-of-flight systems have been used for different applications.

For example, in golf, time-of-flight range finders have been used to calculate a distance to the hole. These range finders have typically been designed as linear systems that output a narrow, straight line laser beam. Once the laser beam struck an object in the straight line path, a reflected portion of the laser beam striking the object was detected at a detector and the distance of the object was calculated. These range finders could only measure the distance of the first object in the laser beam path; the range finders could not differentiate between different objects at different distances nor could they identify the distance of objects in more than one dimension.

More sophisticated time-of-flight devices included image sensors, such as those in digital cameras, containing an array of many light detection cavities or photosites. The image sensors were capable of measuring the distance and position of multiple objects in at least two dimensions based on the detected location of the light reflected off each object within the array and the calculated time-of-flight. However, image sensors are expensive and slow. Image sensors require relatively long processing times to analyze the data at each of the photosites in the array. Additionally, while the accuracy of these devices improves as the number of photosites increases, the cost and processing time need to analyze the data at each of the photosites also increases. This makes the use of image sensors impractical for low cost or time sensitive applications, such as vehicle crash avoidance systems.

There is therefore a need for quickly and accurately calculating a position of multiple objects in at least two dimensions in a cost effective manner.

DETAILED DESCRIPTION

In different embodiments, time-of-flight technology may be combined with optical detection technology identifying an angle of detected light based on a proportion of the light detected at each of at least two light sensors. The optical detection technology may include a light detector with two or more light sensors. The light detector may have an outer surface or periphery with an aperture. Each of the light sensors may be arranged at different orientations in the light detector with respect to the aperture so that each sensor is able to detect a different subset of the light passing through the aperture. The subset of the light detected at each light sensor may change as the angle of the light passing through the aperture changes. The effective angle of the light passing through aperture may then be calculated from the proportion of light detected at the each of the sensors associated with the aperture.

The time-of-flight technology may include a transmitter emitting a pulse of light at a predetermined time, the above mentioned light detector, and a calculation device. The light detector may be configured to detect the emitting light pulse. In some instances the transmitter and/or light detector may be modulated to improve the detection accuracy at the light detector. The calculation device may calculate a time-of-flight of the emitted light pulse based on a time difference between a time the light pulse is emitted and a time the light pulse is detected at the light detector. This time difference may represent the time needed for the light pulse to travel first from the transmitter to an object in the path of light pulse and second from the object to the light detector after the light pulse strikes the object and is reflected off the object. The distance that the light pulse traveled may be calculated by multiplying the calculated time-of-flight by the speed of light.

The distance that the light pulse traveled calculated using the time-of-flight technology may be combined with the effective angle of the light passing through the aperture calculated using the light detection technology to provide a position of the object relative to the detector in two dimensions with a minimum of two light sensors in the optical detector. The position of the object relative to the detector may also be calculated in three dimensions with a minimum of three light sensors in the optical detector.

Multiple objects in the path of the light pulse may also be identified and their respective positions may also be calculated. In instances with multiple objects located at different distances from the transmitter and the light detector, the time needed for the light pulse to travel from the transmitter to the object and then to the detector may vary. As a result, the light detector may first detect the received light pulse after it is reflected off a first object located closest to the transmitter and the detector. Thereafter, the light detector may again detect the light pulse a short time later after it is reflected off a second object located further away than the first object. The proportion of the reflected light reaching each of the light sensors may vary each time the light pulse is detected due to the different locations of the objects relative to each other and then the detector.

As discussed herein, object position information of one or multiple objects may be determined in two or three dimensions by combining the output from a respective minimum of two or three light sensors in a light detector with the calculated time-of-flight information. By using substantially less light sensors than a traditional digital camera image sensor, positional information of one or more objects may be calculated quickly and accurately in at least two dimensions at a much lower cost.

Figure 1:
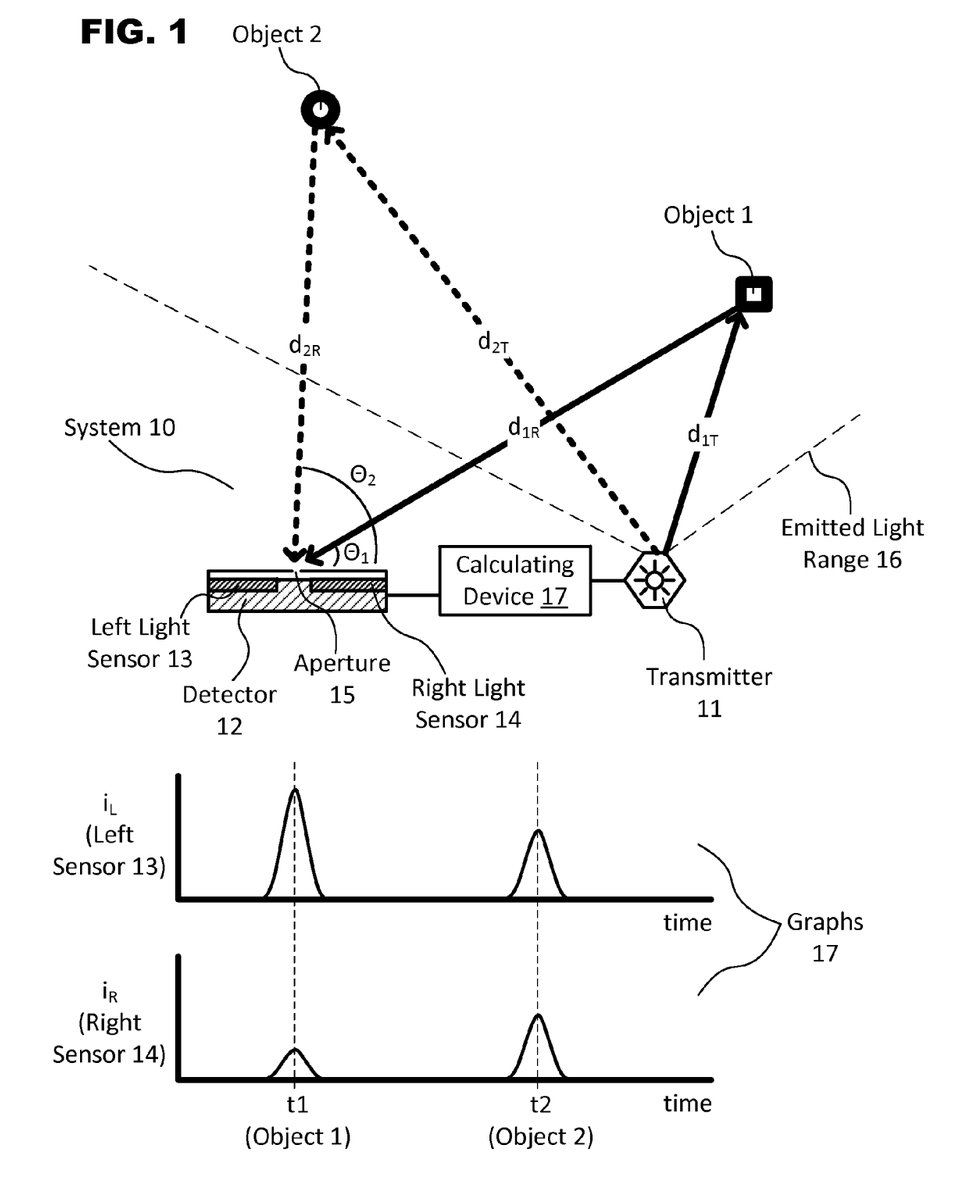
FIG. 1 shows an exemplary time-of-flight system and plots of light sensor currents.

FIG. 1 shows an exemplary time-of-flight system 10 and plots 17 of currents $i_L$ and $i_R$ from a respective left sensor 13 and right sensor 14. An exemplary time-of-flight system 10 may include a transmitter 11, a light detector 12, and a calculation device 17 coupled to the transmitter 11 and the light detector 12.

The transmitter 11 may emit a pulse of light. The light pulse may be emitted over a range 16. The range 16 may include a predetermined volume of space extending from the transmitter 111. The emitted light may reach any object within the range 16. The example shown in FIG. 1 includes two objects 1 and 2 with the range 16 of the transmitter 11. Object 1 is located a distance $d_{1T}$ from the transmitter 11 and a distance $d_{1R}$ from a center of an aperture 15 in the detector 12. Object 2 is located a distance $d_{2T}$ from the transmitter 11 and a distance $d_{2R}$ from the center of the aperture 15.

Light emitted from the transmitter 11 may have to travel distances $d_{1T}$ and $d_{2T}$ to reach respective objects 1 and 2. Once the emitted light reaches these objects 1 and 2, a portion of the light may be reflected off the respective objects 1 and 2 and then travel respective distances $d_{1R}$ and $d_{2R}$ to reach the detector 12. The portion of the light pulse reflected off object 1 that reaches the detector 12 may have an angle of $\theta 1$ with respect to the detector 12. The portion of the light pulse reflected off object 2 that reaches the detector may have an angle of $\theta 2$ with respect to the detector 12.

The detector 12 in FIG. 1 includes two light sensors, a left sensor 13 and a right sensor 14 within a housing having an aperture 15. The light sensors 13 and 14 may in some instances include photodetectors or electrodes connected to an epitaxial layer on a substrate. Each of the light sensors 13 and 14 may generate a respective current proportional to amount of light at the respective sensor 13 and 14.

The sensors 13 and 14 may be coupled to a calculation device 17. The transmitter 11 may also be coupled to the calculation device 17. The calculation device 17 may include a central processing unit, microcontroller, or other processing device capable of performing mathematical operations. The calculation device 17 may be configured to calculate a time-of-flight of the light pulse based on the time difference between a start time of the emission of the light pulse at the transmitter 11 and a detection time of the light pulse at the detector 12.

The calculated time-of-flight t1 and t2 of the light pulse with respect to each object 1 and 2 may then be multiplied by the speed of light to determine the total distance traveled by the light. This distance information may be used to determine a position of the object in one dimension relative to the detector. The total distance traveled by the light with respect to each object may be calculated as:

$$d_{1T} + d_{1R} = c \cdot t1 \quad (1)$$

$$d_{2T} + d_{2R} = c \cdot t2 \quad (2)$$

In those instances where the distance between transmitter 11 and the detector 12 is much less than the distance between the detector 12 and the respective object 1 or 2, the distance $d_{1T}$ and $d_{1R}$ may be approximated as being equal to each other and the distances $d_{2T}$ and $d_{2R}$ may also be approximated as being equal to each other. Thus, equations (1) and (2) may be simplified to:

$$d_{1R} \approx (c \cdot t1)/2 \quad (3)$$

$$d_{2R} \approx (c \cdot t2)/2 \quad (4)$$

The calculation device 17 may also compare the currents $i_L$ and $i_R$ outputted by each respective sensor 13 and 14 to determine a proportion of the total current outputted by each sensor 13 and 14. The proportion of the currents outputted by each sensor may be used to determine the angle of reflected light with respect to the detector 12. For example, as shown in FIG. 1, the light reflected off object 1 may arrive at the aperture 15 of the detector at an angle $\theta 1$. At this angle $\theta 1$, most of the reflected light will be directed onto the left light sensor 13 instead of the right light sensor 14. As a result, the left sensor 13 may output a substantially higher current than the right sensor 14.

However, the light reflected off object 2, which is located nearly vertical to the aperture 15 may arrive at the aperture 15 at a near vertical angle $\theta 2$. Thus, the reflected light off object 2 may be more evenly distributed between the left sensor 13 and the right sensor 14. As a result, the currents generated by the left sensor 13 and the right sensor 14 may be very similar. Thus, the angle of the reflected light may be calculated based on the ratio of currents detected by each of the sensors 13 and 14. This angle information may provide information about the location of the object in one dimension.

The two graphs 17 show relative changes to the current $i_L$ at the left sensor 13 (upper graph) and the current $i_R$ at the right sensor 14 (lower graph) over time. The pulse may be emitted from the transmitter 11 at time t0. At about time t1, the portion of the light pulse reflected off object 1 may be received at sensors 13 and 14. This may cause the respective current spikes at time t1 depicted in both graphs. Due to the location of object 1 relative to the aperture 15, a greater proportion of the reflected light may project onto the left sensor 13 instead of the right sensor 14. Since the current generated at each sensor 13 and 14 may be proportional to the amount of light projecting onto the sensor, the current $i_L$ generated at the left sensor 13 may be substantially more than the current $i_R$ at the right sensor 14 when the sensors 13 are spaced equidistant from the aperture 15 and the aperture 15 is symmetric.

At about time t2, the portion of the light pulse reflected off object 2 may be received at sensors 13 and 14. This may cause the respective current spikes at time t2 depicted in both graphs. Due to the nearly vertical location of object 2 above the aperture 15, a roughly equal proportion of the reflected light may project onto each of the sensors 13 and 14 when the sensors 13 are spaced equidistant from the aperture 15 and the aperture 15 is symmetric. Since the current generated at each sensor 13 and 14 may be proportional to the amount of light projecting onto the sensor, the current $i_L$ generated at the left sensor 13 may be relatively similar to the current $i_R$ at the right sensor 14.

The angles $\theta 1$ and $\theta 2$ calculated by the calculation device 17 may be similar to:

$$\theta 1 \sim i_{L_{t1}} / i_{R_{t1}} \quad (5)$$

$$\theta 2 \sim i_{L_{t2}} / i_{R_{t2}} \quad (6)$$

In some instances, the detector 12 may have two or more light sensors. Each of the light sensors may detect a different portion of the light pulse emitted from the transmitter 11 and reflected off an object. A calculation device 17 may be coupled to the transmitter 11 and the detector 12. The calculation device 17 may calculate a time-of-flight of the light pulse and a position of the object relative to the detector 12 based on the calculated time-of-flight and a calculated proportion of the portions of reflected light pulse detected at the light sensors.

If there are multiple objects in a range 16 of the emitted light pulse, then each of the light sensors may detect a different portion of the light pulse reflected off each of the multiple objects. The calculation device 17 may calculate a time-of-flight of the light pulse with respect to each of the objects based on peak currents generated at each light source over time. The calculation device 17 may also compare the respective peak currents of different light sources to each other and the calculated time-of-flight for the respective object to calculate the position of the respective object.

When the detector 12 includes two light sensors, the calculation device 17 may calculate the object position in two dimensions. A first of the two dimensions may be obtained from the calculated proportion of the portions of the reflected light pulse detected at the light sensors. A second of the two dimensions may be obtained from the calculated time-of-flight.

Figure 2:
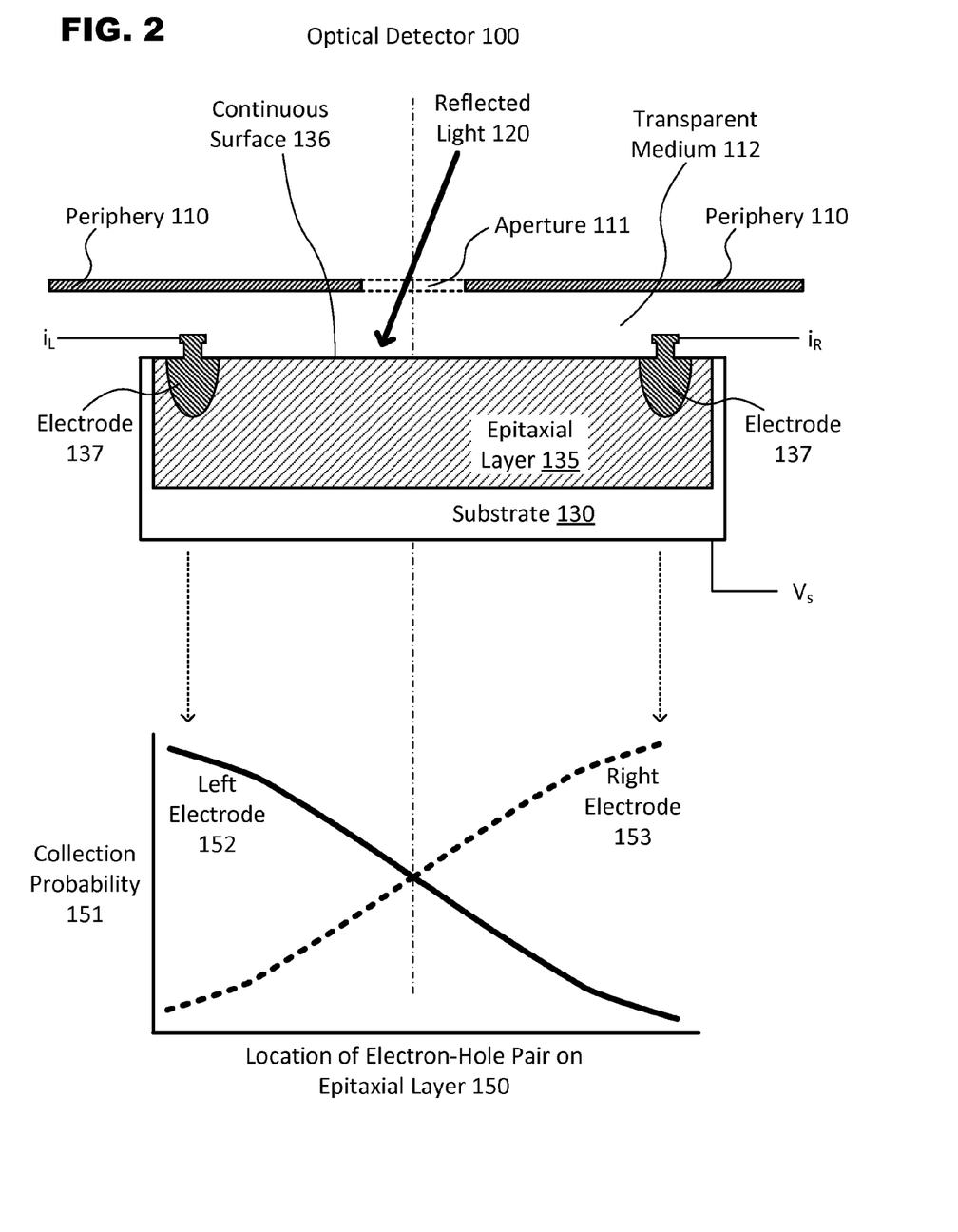
FIG. 2 shows a first exemplary optical detector in an exemplary time-of-flight system.

FIG. 2 shows an exemplary optical detector 100. The optical detector 100 may include a periphery 110 such as an exterior surface or housing. In those instances where the optical detector 110 is formed from a semiconductor, the periphery 110 may be an outer surface of the semiconductor. In those instances where the optical detector 110 is formed as an integrated circuit, the periphery 110 may be an exterior surface of the integrated circuit. The periphery 110 may be metallic or made from another substance impervious to light.

The periphery 110 may have an aperture 111 that allow reflected light 120 from the light pulse emitted by the transmitter and reflected off an object to pass through the aperture 111. The aperture 111 may be any type of opening in or section of the periphery 110 that is transparent. In some instances, the aperture 111 may be a physical opening or hole in the periphery 110. In other instances, the aperture 111 may be section of the periphery 110 that is altered to make it transparent or permeable to light without necessarily creating a physical opening or hole. Such an altering may occur in some instances by removing an opaque coating covering a section of the periphery 110 to make it transparent, replacing a section of the periphery 110 with a transparent material, or by other techniques. The aperture 111 may be a slit or pinhole, or it may have any other shape or form.

One or more edges of aperture 111 may be beveled. In some instance, each edge of the aperture directed away from the epitaxial layer 135 may be beveled to reduce an amount of incident light that is reflected off the edge and redirected onto the epitaxial layer 135.

An interior of the optical detector 100 may include a substrate 130 having an epitaxial layer 135. The epitaxial layer 135 may be applied on a surface of the substrate 130 facing the aperture 110. The epitaxial layer 135 may, in some instances, be a germanium based, silicon based, or germanium and silicon based epitaxial layer. Other types of epitaxial layers may be used in other embodiments.

Two or more electrodes 137 may be situated at least partially in or on the epitaxial layer 135 so as to electrically contact the epitaxial layer. The contacting of the electrodes 137 to the epitaxial layer 135 may enable electrodes 137 to collect electron-hole pairs in the epitaxial layer 135 generated from the absorption of the reflected light 120 in the epitaxial layer 135 to detect a quantity of the light received at the epitaxial layer 135. The depths that the electrodes 137 are positioned in the epitaxial layer 135 may be selected to correspond to an expected penetration depth of a wavelength of the reflected light 120 to be detected to maximize the collection of electron-hole pairs by the electrode at that penetration depth.

The electrodes 137 may have any shape. For example, in some instances the electrodes may be discrete, point shaped electrodes. In other instances the electrodes may be continuous electrodes having a length or other dimension corresponding to that of the aperture 111, such a length corresponding to a slit length of a slit aperture or a rectangular shape corresponding to a rectangularly shaped slit aperture.

The two or more electrodes 137 may be located at predetermined positions relative to the aperture 111. For example, in some instances, such as that shown in FIG. 1, the electrodes 137 may be located at equal distances from a center of the aperture 111. In other instances, one or more of the electrodes 137 may be located at different distances than other electrodes 137 from the center of the aperture 111. Electrodes 137 may also be located opposite from each other relative to the center of the aperture 111 in some instances, but in other instances, the electrodes 137 may be positioned in different orientations.

The epitaxial layer 135 may also be continuous and have a continuous surface 136 between each of the electrodes. This continuity ensures that the entire section of the epitaxial layer located between the electrodes 137 is available to absorb light and generate electron-hole pairs. In the past, the presence of trenches and other isolators compartmentalizing the epitaxial layer 135 prevented maximum absorption of incident light reaching the epitaxial layer 135 and generation of electron-hole pairs collected by the electrodes.

The electrodes 137 may be electrically coupled to one or more current sensing devices that is able to identify a relative amount of collected electron-hole pairs at each electrode 137 that were generated in the epitaxial layer 135 by the absorption of the reflected light 120 in the epitaxial layer 135. The graph 150-153 shown in FIG. 1 depicts a probability distribution function of a probability 151 that electron-hole pairs generated at different locations in the epitaxial layer 135 along the axis 150 will be collected by either the electrode 137 on the left side 152 of FIG. 1 (as indicated by the solid plot line) or the electrode 137 on the right side 153 of FIG. 1 (as indicated by the dashed plot line). Based on this known probability distribution, the measured currents at the respective left 152 and right 153 electrodes 137 ($i_L$ and $i_R$) may be compared to calculate an expected centroid of the reflected light 120 between the electrodes 137. An angle of the reflected light 120 may then be calculated based on the expected centroid. The probably distribution function may be determined experimentally. This approach of using the probability distribution function to calculate the angle of the reflected light 120 may be accurate over only small separation distances between the electrodes 137 on the order of tens of microns rather than the several millimeters needed to build a traditional angle measuring photodiode detector. In instances where a millimeter scale photodetector is needed, several optical detectors 100 may be coupled together to achieve the millimeter scale.

An angle of the reflected light 120 passing through the aperture 111 and reaching the epitaxial layer 135 may be calculated from the current measured at each of the electrodes 137. In the case of two electrodes 137 as shown in FIG. 1, the angle θ of the reflected light 120 may be calculated from the left and right currents $i_L$ and $i_R$ as:

$$f(\theta) = \frac{i_L - i_R}{i_L + i_R} \qquad (1)$$

The continuous nature of the epitaxial layer 135 between the electrodes 137 may cause in a resistance between each of the electrodes 137 equivalent to an effective resistor $R_{eff}$ between the electrodes. The actual size of $R_{eff}$ may vary depending on the distance between the electrodes, the number of electrodes, the resistivity of the epitaxial layer 135, the thickness of the epitaxial layer 135, and a bias voltage $V_S$ applied to the substrate. A voltage source applying bias voltage $V_S$ may be coupled to substrate and may apply the bias voltage to the epitaxial layer 135 to change a light detection sensitivity of the electrodes 137 by altering the amount of light required to be absorbed in the epitaxial layer 135 to generate an electron-hole pair. The optical detector 100 may be designed to have a large $R_{eff}$ to suppress noise between circuits connected to each of the electrodes and to reduce Johnson noise. $R_{eff}$ may be made large by creating a substantial depletion region in the epitaxial layer 135 around the electrodes 137. This may be accomplished using a slightly n-type high resistivity epitaxial layer 135 with p-type electrodes to ensure a substantial depletion region around the electrodes. In other instances a p-type epitaxial layer 135 may be used with n-type electrodes.

In some instances, the aperture 111 and/or periphery 110 may be positioned directly on top of the epitaxial layer 135. In other instances, the epitaxial layer 135 may be separated from the aperture 111 and/or periphery 110 by a transparent medium 112. The transparent medium 112 may be a solid, liquid, or gas that is transparent and may include substances such as air, polymers, and glass. In some instances where the epitaxial layer 135 is separated from the aperture 111 and/or periphery 110, the periphery 110 and/or aperture 111 may be positioned at various heights above the epitaxial layer 135, including but not limited to heights less than 30 microns and/or heights less than 10 microns.

The optical detector 100 need not include any lens or other devices that focus light. Thus, the aperture 111 and medium 112 need not focus the reflected light 120 passing through them. By not including any lenses or other light focusing devices, it is possible to reduce the size and manufacturing costs and manufacturing time of the optical detector 100. The light detection efficiency of the optical detector 100 may, in some instance, be improved by using one or more lens to focus light on or below the continuous surface 136 of the epitaxial layer 135. In some instances the aperture may be replaced with a lens.

Figure 3:
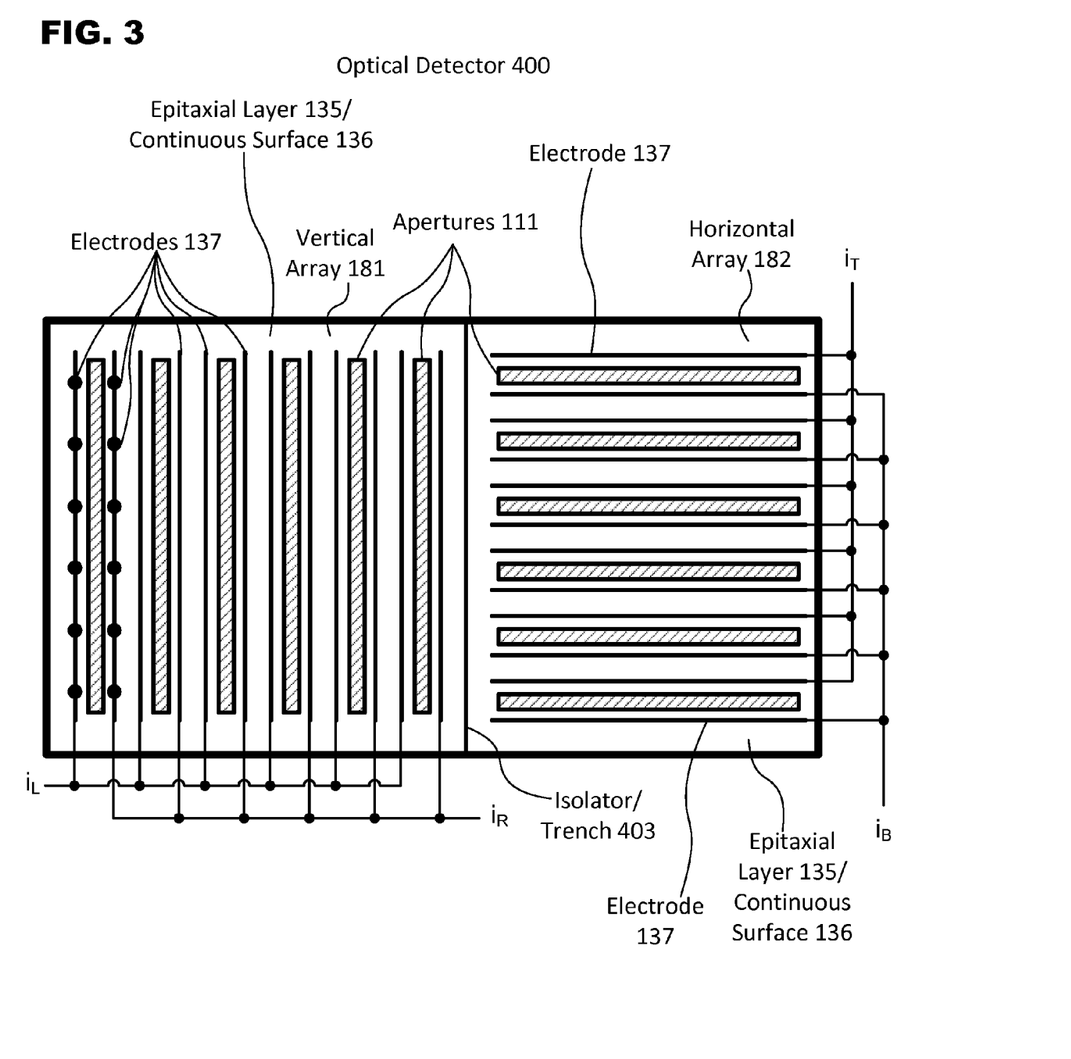
FIG. 3 shows a second exemplary optical detector in an exemplary time-of-flight system.

FIG. 3 shows an embodiment of an optical detector 400 including both a vertical array 181 and a horizontal array 182 of slit apertures 111 and corresponding sets of electrodes 137. FIG. 3 shows six exemplary vertical slit apertures in the vertical array 181 and six exemplary horizontal slit apertures in the horizontal array 182. Each of the slit apertures 111 may have a set of one or more electrodes positioned parallel to the slit aperture 111 along a longitudinal direction of the slit aperture 111 on both sides of the slit aperture 111. The slit apertures 111 may also have beveled edges pointing away from the epitaxial layer 135 to minimize the likelihood that the reflected light 120 will be reflected off the edge and redirected onto the epitaxial layer 135. Each electrode 137 may be arranged in the epitaxial layer 135 to detect a respective quantity of the incident light passing through each aperture.

Some of the electrodes 137 may be rectangularly shaped and extend longitudinally for at least a similar distance as the respective slit aperture 111 associated with the electrode 137. Some of the electrodes 137 may also be positioned parallel to its associated slit aperture 111, and in some instances, pairs of these electrodes 137 may be positioned at equal distances from and on either side of the associated slit aperture 111 as shown in FIG. 3. Each pair of these electrodes 137 may also be centered with a center of its corresponding slit aperture 111. In other instances, one or more electrodes or electrodes pairs may be offset from a center of its corresponding slit aperture 111.

In some instances, the electrodes 137 may include several point electrodes such as those shown parallel to both longitudinal sides of the left most aperture 111 in FIG. 3. The point electrodes may be positioned along two or more imaginary lines oriented parallel to the slit aperture. In the example shown in FIG. 3, the two imaginary lines may run vertically along both sides of the left most slit aperture 111. Respective point electrodes running along each imaginary line associated with a particular aperture may be electrically coupled together.

The vertical slit apertures 111 in the vertical array 181 may be arranged parallel to each other and perpendicular to the horizontal slit apertures 111 in the horizontal array 182. Different electrodes 137 associated with different apertures 111 may be coupled together provided that the orientation of the electrode 137 with respect to its corresponding aperture 111 is similar. For example, as shown in FIG. 3, all of the electrodes located on the left side of different apertures 111 may be electrically coupled to generate an aggregated left current $i_L$ and increase the light detection efficiency of the optical detector 400. Similarly, all the electrodes on the right side, top side, and bottom side of the apertures 111 may also be coupled together to generate aggregate right $i_R$, top $i_T$, and bottom $i_B$ currents and further increase the light detection efficiency.

In some instances, an electrical signal isolator 403 may be inserted or formed in the epitaxial layer 135 to subdivide the epitaxial layer 135 into multiple separate continuous surfaces 136. The isolator 403 may surround one or more electrodes 137 to isolate the ability of the electrodes 137 to collect only those electron-hole pairs that are generated within the isolated region surrounding the electrode 137. In some instances the isolator 403 may be used to compartmentalize the epitaxial layer 135 around each set of electrodes associated with each aperture 111 so that the quality of light reaching the epitaxial layer 135 that is detectable by a respective electrode 137 is isolated to only the reflected light 120 that actually passes through the aperture 111 associated with the electrode 137. In the example shown in FIG. 3, the isolator 403 is a trench that subdivides the epitaxial layer 135 into two continuous sections, a first section encompasses the electrodes 137 in the vertical array 181 and a second section encompasses the electrodes 137 in the horizontal array 182.

An optical detector similar to that shown in FIG. 3 may include a periphery 110 having multiple slit apertures 111. At least two of the slit apertures 111 may be oriented orthogonally to each other. The optical detector may also include a substrate 130 having an epitaxial layer 135 receiving light 120 passing through each of the slit apertures 111. The optical detector may also include a set of electrodes 137 associated with each slit aperture 111. Each electrode 137 in each set may be arranged in the epitaxial layer 135 to detect a quantity of the received reflected light 120 passing through the respective slit aperture 111. The epitaxial layer 135 may have a continuous surface 136 at least for each set of electrodes 137 that encompasses the electrodes 137 in each respective set of electrodes 137. In some instances the epitaxial layer 135 may have a single continuous surface 136 encompassing every electrode 137. The epitaxial layer 135 may be germanium based in some instances.

The optical detector 400 shown in FIG. 3 includes more than three light sensors. The currents generated at each of these light sensors in both the vertical array 181 and the horizontal array 182 may be used by a calculation device to calculate the position of an object in three dimensions. Two of the dimensions of the position of the object may be obtained from the calculated proportion of the portions of the reflected light pulse detected at the light sensor electrodes 137 in both the vertical array 181 and the horizontal array 182. The third dimension position information may be derived from the calculated time-of-flight of the light pulse.

Figure 4:
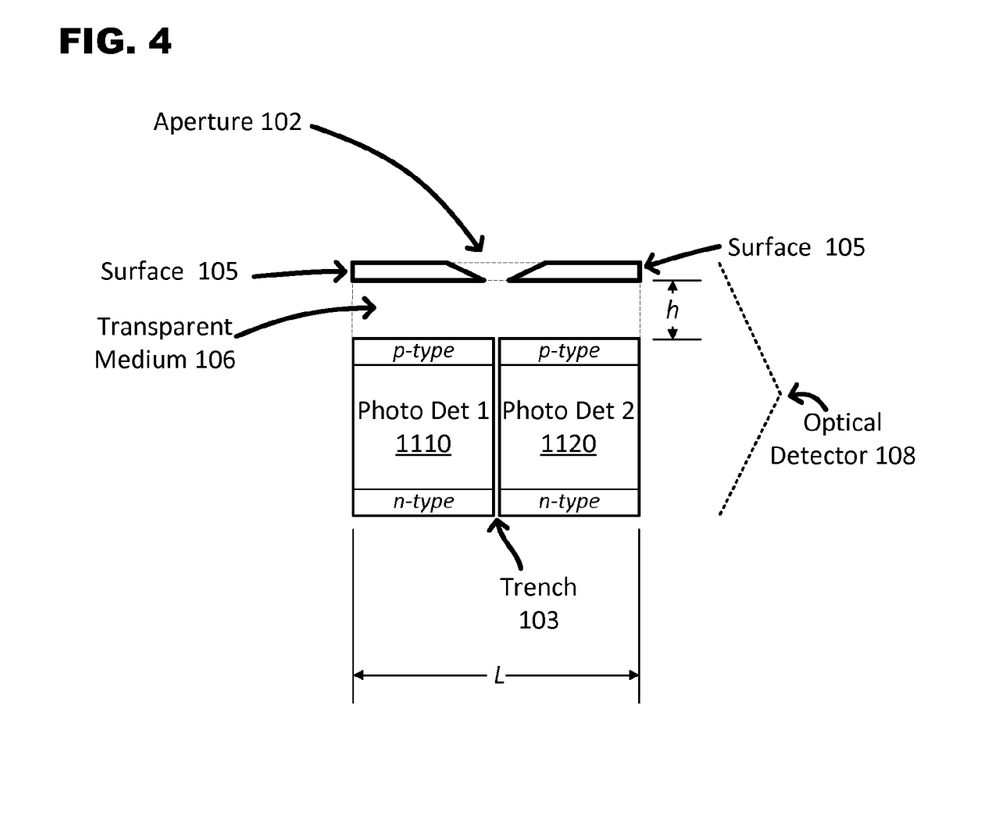
FIG. 4 shows an exemplary side-view perspective of a third exemplary optical detector in an exemplary time-of-flight system.
Figure 5:
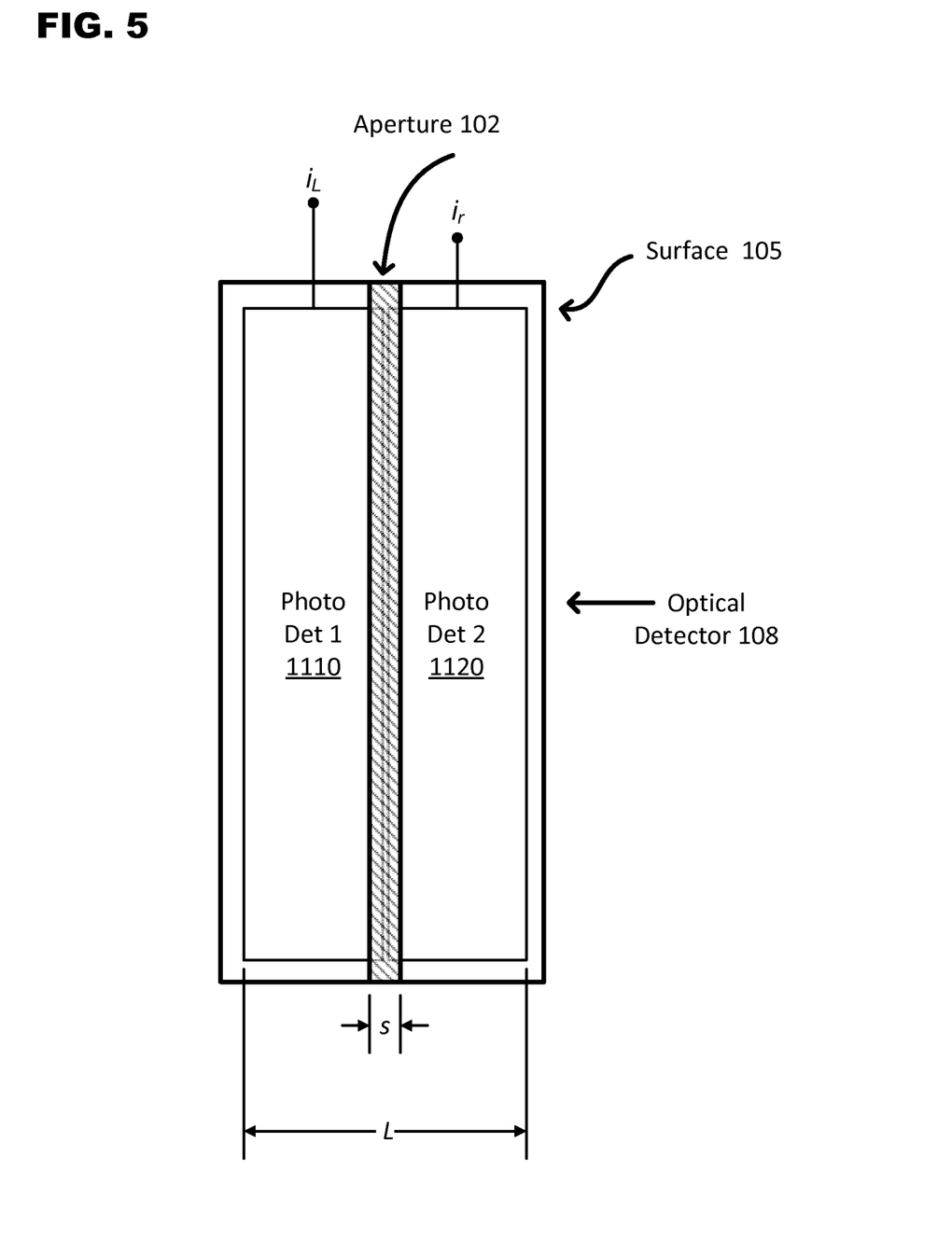
FIG. 5 shows an exemplary top-view perspective of the third exemplary optical detector shown in FIG. 4.

FIG. 4 shows an exemplary side-view perspective and FIG. 5 shows an exemplary top-view perspective of an optical detector 108 having a single aperture 102 and an associated pair of photodetectors 1110 and 1120 in an embodiment of the invention. In these embodiments, the emitted light pulse that is reflected off an object positioned on one side of an optical detector surface 105 may pass through the aperture 102 to reach the photodetectors 1110 and 1120. In different embodiments, different numbers of apertures and photodetectors may be used.

The aperture 102 may be a slit having a width s and may be positioned at a height h above the photodetectors 1110 and 1120. In some configurations, h may be less than 30 µm and in some space saving configurations, h may be less than 10 µm or even less than 1 µm. A medium allowing light to pass through it may be placed between the aperture 102 and the photodetectors 1110 and 1120. In some instances, the medium may be glass, including forms of glass used during semiconductor device fabrication. The width s of the photodetector 1110 and 1120 may depend on an angular range requirement and h.

The angle of the light reflected off an object may be calculated by measuring a relative proportion of photocurrents detected at each of the photodetectors, provided that the reflected light is able to reach at least two of the photodetectors. When all of the reflected light from the light source falls on only one detector it may not be possible to measure changes to the angle of the reflected light. The maximum angle $\theta_{max}$ that may be measured may occur approximately at $\tan(\theta_{max}) \sim \pm s/h$.

If the reflected light is angularly distributed so that the reflected light reaches the photodetectors from multiple angles with intensity $In(\theta)$, then the average angular position of the emitted light may be calculated. Assuming $S_L(\theta)$ and $S_r(\theta)$ are the respective responses of the left and right photodetectors to light at angle $\theta$ detected at the photodetectors, then the photocurrents measured by the left and rights photodetectors may calculated as:

$$i_L = \int_\theta \ln(\theta) \cdot S_L(\theta) d\theta \text{ and } i_r = \int_\theta \ln(\theta) \cdot S_r(\theta) d\theta.$$

However, the photocurrents calculated from both of these integrals may be equivalent to photocurrents generated from a "virtual" point light source at a centroid angle of the distribution. This centroid angle may be calculated from the measured photocurrents at the left and right photodetectors and used to calculate the equivalent centroid angle of the light source.

The photodetector pair 1110 and 1120 may have a combined total width L, the center of which may be aligned with a center of each respective aperture 102. In some embodiments, a center of a photodetector pair may be offset from the center of a respective aperture and in some other instances the amount of offset may vary for different photodetector pairs. Optical detector 108 may be configured so that the outputs of corresponding photodetectors in each of a plurality of photodetector pairs are coupled together to increase light collection efficiency. For example, the photocurrent outputs of the left most photodetector 1110 in each of several photodetector pairs may be coupled together to generate an aggregate current $i_L$ proportional to an aggregated detected amount of light at each of the left most photodetectors 1110. Similarly, the photocurrent outputs of each of the right most photodetectors 1120 in each of several photodetector pairs may be coupled together to generate an aggregate current $i_r$ of the right most photodetector 1120.

The optical detector surface 105 may be metallic in some instances, such as a metal interconnecting layer used in silicon integrated circuit manufacturing. The edges of the apertures 102 may be beveled, as shown in FIG. 4, and in some instances the beveled edges may be pointed away from the detectors, as also shown in FIG. 4. Each of the photodetectors 1110 to 1120 may be electrically isolated and separated from the others by a trench 103.

As the angle and direction of the reflected light changes from the left side of FIG. 4 above the surface 105 to the right side above the surface 105 (or vice versa), the projection of the reflected light through the aperture 102 may also change from initially being entirely projected onto the right detector 1120, to being projected less on the right detector 1120 and more on the left detector 1110 until the reflected light is projected entirely on the left detector 1110.

The angle of the reflected light may be calculated by comparing the photocurrents $i_L$ and $i_r$, which may be proportional to the detected light at the left and the right photodiodes respectively after the reflected light passes through the aperture 102. The ability to calculate the angle of the reflected light may be dependent on the ability to detect the reflected light at each photodetector 1110 and 1120 as the angle calculation depends on the proportion of light reaching each of the photodetectors 1110 and 1120.

Figure 6:
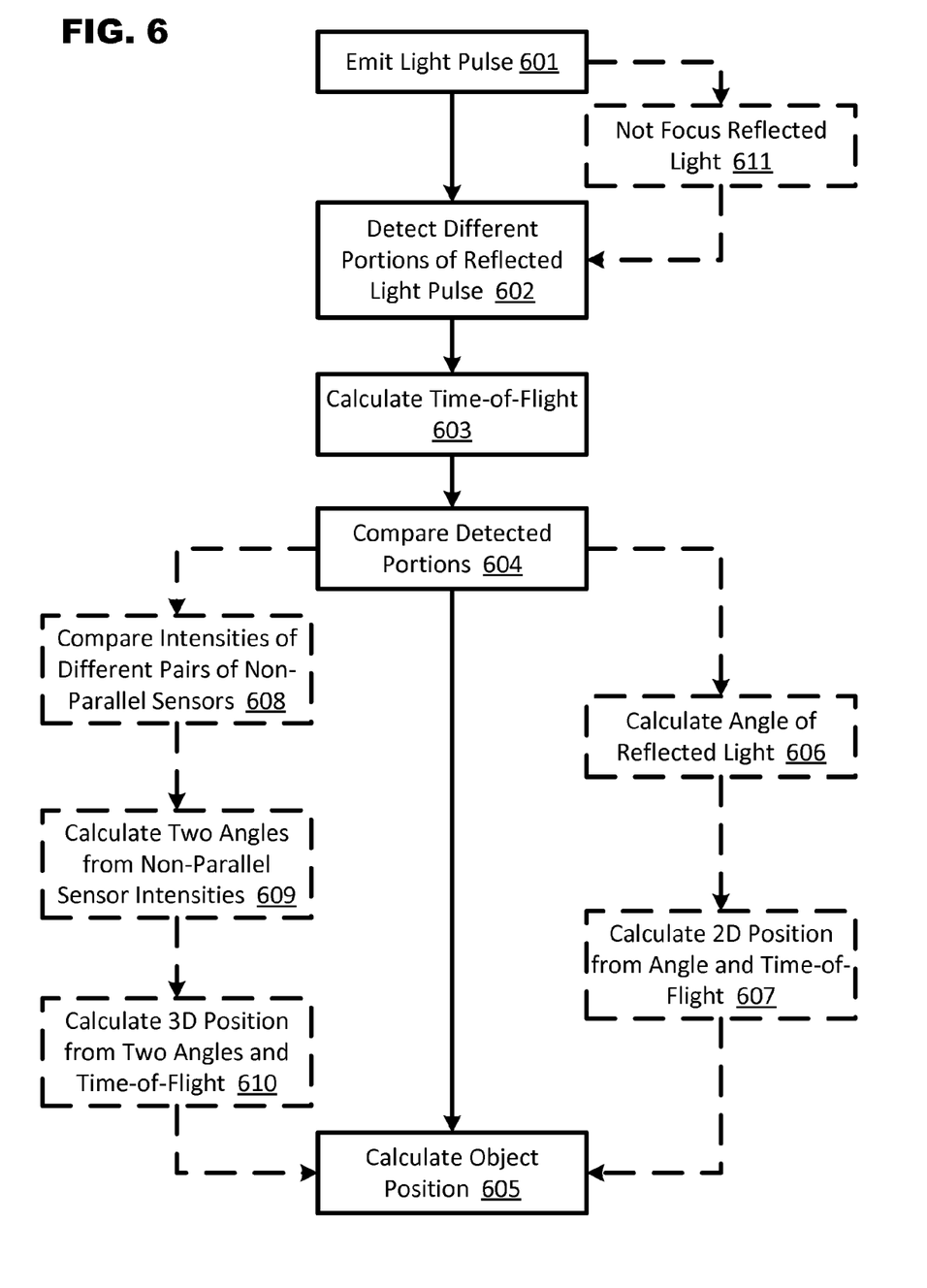
FIG. 6 shows exemplary methods.

FIG. 6 shows exemplary methods. In box 601, a light pulse may be emitted. The light pulse may be emitted from a transmitter at a predetermined emission time. The transmitted may be coupled to a calculation device that is configured to calculate a time-of-flight of the light pulse starting from the predetermined emission time until a reflected portion of the light pulse is subsequently detected at a detector.

In box 602, different portions of the light pulse may be detected at each of a plurality of light sensors in the detector after the light pulse is reflected off an object and passes through an aperture.

In box 603, a time-of-flight of the light pulse may be calculated based on an elapsed travel time of the light pulse starting from the time the light pulse is emitted from the transmitter until the reflected portion of the light pulse is detected at the detector.

In box 604, an intensity of at least two of the different portions of the reflected light pulse detected at two or more of the light sensors in the detector may be compared to each other. In some instances, this comparing may include calculating a ratio or proportion of the total light detected at each of the respective at least two light sensors.

In box 605, a position of the object may be calculated based on the calculated time-of-flight in box 603 and the intensity comparing in box 604.

In box 606, an angle of the reflected light pulse relative to the light sensors and/or the detector may be calculated from the intensity comparing in box 604.

In box 607, a two-dimensional position of the object relative to the light sensors and/or the detector may be calculated. A first dimension of the two-dimensional position of the object may be calculated based on the angle calculated in box 606. A second dimension of the two-dimensional position of the object may be calculated based on the time-of-flight calculated in box 603.

In some instances, a light detector may include three or more light sensors at least two of which are oriented non-parallel to each other. The non-parallel orientation of these light sensors may be used to determine at least two different angles of the reflected light with respect to the detector. Two different angles may be used to calculate a position of the object in two dimensions. In box 608, the intensity of different portions of the light pulse detected at each of a first pair of light sensors may be compared to each other and the intensity of different portions of the light pulse detected at each of a second pair of light sensors may also be compared to each other. The second pair of light sensors may be oriented non-parallel to the first pair of light sensors in the detector.

In box 609, a first angle of the reflected light pulse with respect to the first pair of light sensors may be calculated from the first light sensor pair intensity comparing and a second angle of the reflected light pulse with respect to the second pair of light sensors may be calculated from the second pair intensity comparing.

In box 610, a three-dimensional position of the object relative to the detector and/or the light sensors may be calculated. The first and second dimensions of the three-dimensional position may be calculated based on the first and second angles of the reflected light pulse calculated in box 609. The third dimension of the three-dimensional position may be calculated based on the time-of-flight calculated in box 603.

In box 611, at least the portions of the light pulse reflected off an object need not be focused before performing the functions in boxes 602 to 610.

In some instances, the detector may be configured to detect the intensity of different portions of the reflected light pulse passing through an aperture in a periphery of the detector. The intensity of the different portions of the reflected light pulse may be detected at each of a plurality of electrodes in an epitaxial layer on a substrate within the detector. The epitaxial layer may have a continuous surface encompassing each of the electrodes. The surface of the substrate contain the epitaxial layer may face the aperture in the periphery of the detector so that the reflected light passing through the aperture reaches and is absorbed in the epitaxial layer. The detected intensities of the light pulse at two or more of the electrodes may be compared to each other and the position of the object may be calculated based on the calculated time-of-flight and the compared intensities.

In other instances, the detector may be configured to detect the intensity of different portions the light pulse at each of a plurality of photodetectors after the reflected light pulse passes through an aperture in the detector. The detected intensities of the light pulse at two or more of the photodetectors may then be compared to each other and the position of the object relative to the detector may be calculated based on the calculated time-of-flight and the compared intensities.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments and figures pertain to specific numbers, orientations, and positions of apertures, light sensors, photodetectors, and electrodes, but in other embodiments, different numbers, orientations, shapes, and positions of these components may be used.

We claim:

1. A time-of-flight system comprising:
    a transmitter emitting a pulse of light;
    a lens-less detector having:
        a plurality of light sensors, each accepting light from any angle and detecting a different portion of the light pulse that passes through an aperture in the detector after being emitted from the transmitter and reflected off an object;
        a periphery having a plurality of non-intersecting slit apertures, at least two of which are oriented orthogonally to each other; and
    a calculation device coupled to the transmitter and the detector for calculating a time-of-flight of the light pulse and a position of the object relative to the detector based on the calculated time-of-flight and a calculated proportion of the portions of the reflected light pulse detected at the light sensors.

2. The system of claim 1, wherein the detector includes two light sensors and the calculation device calculates the object position in two dimensions, a first of the two dimensions is obtained from the calculated proportion and a second of the two dimensions is obtained from the calculated time-of-flight.

3. The system of claim 1, wherein the detector includes at least three light sensors and the calculation device calculates the object position in three dimensions, two of the dimensions are obtained from the calculated proportion of the portions of the reflected light pulse detected at the at least three sensors and a third of the dimensions is obtained from the calculated time-of-flight.

4. The system of claim 1, wherein the light sensors each detect a different portion of the light pulse reflected off a plurality of objects.

5. The system of claim 4, wherein the calculation device calculates a time-of-flight of the light pulse with respect to each of the objects based on peak currents generated at each light source over time and compares respective peak currents of different light sources to each other and the calculated time-of-flight for the respective object to calculate the position of the respective object.

6. The system of claim 1, wherein the light sensors include a pair of photodetectors isolated from each other at a boundary between them, the boundary aligned with at least one of the plurality of slit apertures.

7. The system of claim 6, wherein the boundary is aligned with the aperture when a center of the boundary is centered with a center of at least one of the plurality of slit apertures.

8. The system of claim 1, wherein the sensors are photodetectors and the lens-less detector includes a measuring device calculating an angle of incident light from a proportion of the incident light detected at at least two of the photodetectors after passing through at least one of the plurality of slit apertures.

9. A time-of-flight system, comprising:
    a transmitter emitting a pulse of light;
    a detector having a plurality of light sensors, each detecting a different portion of the light pulse after being emitted from the transmitter and reflected off an object, the detector including:
        a periphery having a plurality of slit apertures, at least two of which are oriented orthogonally to each other;
        a substrate having a continuous epitaxial layer with a continuous surface receiving light passing through at least one of the plurality of slit apertures; and
        a plurality of electrodes, each contacting the epitaxial layer to detect a quantity of the received light, wherein the plurality of electrodes includes two electrodes positioned at equal distances from at least one of the plurality of slit apertures and opposite each other; and
    a calculation device coupled to the transmitter and the detector for calculating a time-of-flight of the light pulse and a position of the object relative to the detector based on the calculated time-of-flight and a calculated proportion of the portions of the reflected light pulse detected at the light sensors.

10. The system of claim 1, the detector further comprising:
a substrate having an epitaxial layer receiving light passing through each of the slit apertures; and
a set of electrodes associated with each slit aperture, each electrode in each set arranged in the epitaxial layer to detect a quantity of the received light passing through the respective slit aperture, wherein the epitaxial layer has a continuous surface at least for each set of electrodes that encompasses the electrodes in each respective set of electrodes.

11. The system of claim 10, wherein the epitaxial layer has a single continuous surface encompassing every electrode.

12. The system of claim 10, wherein the epitaxial layer is germanium based.

13. A method comprising:
emitting a light pulse;
detecting different portions of the light pulse at each of a plurality of light sensors based on a first reflection and at least one subsequent reflection of the light pulse off an object passing through at least one of a plurality of slit apertures, wherein at least two of the plurality of non-intersecting slit apertures are oriented orthogonally to each other an aperture; calculating a time-of-flight of the light pulse;
comparing an intensity of at least two of the different portions to each other;
calculating a position of the object based on the calculated time-of-flight and the intensity comparing.

14. The method of claim 13, further comprising:
calculating an angle of the reflected light pulse from the intensity comparing;
calculating the position of the object in a first dimension based on the calculated angle; and
calculating the position of the object in a second dimension based on the calculated time-of-flight.

15. The method of claim 13, further comprising:
comparing the intensity of different portions of the light pulse detected at each of a first pair of light sensors to each other;
calculating a first angle of the reflected light pulse with respect to the first pair of light sensors from the first light sensor pair intensity comparing;
comparing the intensity of different portions of the light pulse detected at each of a second pair of light sensors to each other;
calculating a second angle of the reflected light pulse with respect to the second pair of light sensors from the second pair intensity comparing, the second pair of light sensors being non-parallel to the first pair;
calculating the position of the object in a first and a second dimension based on the calculated first and second angles of the reflected light pulse; and
calculating the position of the object in a third dimension based on the calculated time-of-flight.

16. The method of claim 13, further comprising:
detecting the intensity of different portions of the reflected light pulse passing through at least one of the plurality of slit apertures at each of a plurality of electrodes in an epitaxial layer on a substrate, the epitaxial layer having a continuous surface encompassing each of the electrodes;
comparing the detected intensities of the light pulse at at least two of the electrodes to each other;
calculating the position of the object based on the calculated time-of-flight and the compared intensities.

17. The method of claim 16, further comprising not focusing the reflected light pulse.

18. The method of claim 13, further comprising:
detecting the intensity of different portions of the light pulse passing through at least one of the plurality of slit apertures at each of a plurality of photodetectors;
comparing the detected intensities of the light pulse at at least two of the photodetectors to each other; and
calculating the position of the object relative to the detector based on the calculated time-of-flight and the compared intensities.

19. The method of claim 13, wherein a number of resolvable light pulses determines a number of measurable independent objects.

20. The method of claim 13, wherein the detecting of the different portions of the light pulse includes calculating a centroid of the first reflection and the at least one subsequent reflection based on comparing currents at electrodes of each of the plurality of light sensors.

* * * * *